(12) United States Patent
Pawlow et al.

(10) Patent No.: US 12,545,570 B2
(45) Date of Patent: Feb. 10, 2026

(54) COLD AND HOT DRINKING WATER DISPENSER WITH DISINFECTING CIRCUIT

(71) Applicant: Scandinavian Innovation Group Oy, Pomarkku (FI)

(72) Inventors: Andrzej Pawlow, Riga (LV); Arturs Pavlovs, Riga (LV)

(73) Assignee: Scandinavian Innovation Group Oy, Pomarkku (FI)

( * ) Notice: Subject to any disclaimer, the term of this patent is extended or adjusted under 35 U.S.C. 154(b) by 161 days.

(21) Appl. No.: 18/571,162

(22) PCT Filed: Jun. 27, 2022

(86) PCT No.: PCT/IB2022/055957
§ 371 (c)(1),
(2) Date: Dec. 15, 2023

(87) PCT Pub. No.: WO2023/275719
PCT Pub. Date: Jan. 5, 2023

(65) Prior Publication Data
US 2024/0308837 A1    Sep. 19, 2024

(30) Foreign Application Priority Data

Jun. 28, 2021  (EP) ..................... 21182069

(51) Int. Cl.
*B67D 1/07*       (2006.01)
*B67D 1/00*       (2006.01)
*B67D 1/08*       (2006.01)

(52) U.S. Cl.
CPC ............. *B67D 1/07* (2013.01); *B67D 1/0009* (2013.01); *B67D 1/0857* (2013.01);
(Continued)

(58) Field of Classification Search
CPC ...... B67D 1/10; B67D 1/0004; B67D 1/0895; B67D 1/0857; B67D 1/0009;
(Continued)

(56) References Cited

U.S. PATENT DOCUMENTS 7,207,189 B2*  4/2007  An ........................... B67D 1/10
                                                   165/63
2010/0074816 A1  3/2010  Nakano et al.
(Continued)

FOREIGN PATENT DOCUMENTS

EP    2913295 A1    9/2015
EP    3103762 A1   12/2016
(Continued)

OTHER PUBLICATIONS

Translation, WO-2019090970-A1.*

*Primary Examiner* — David P Angwin
*Assistant Examiner* — Christopher S. Parisi
(74) *Attorney, Agent, or Firm* — Smartpat PLC

(57) ABSTRACT

A drinking water dispenser includes a cold water tank and a hot water tank. A cold water outlet pipeline connects the cold water tank to a cold water outlet. A hot water outlet pipeline connects the hot water tank to a hot water outlet. A first pipeline connects an inlet pipeline to the cold water tank. A circulation pump circulates hot water in a disinfection mode. The first pipeline is connected to the cold water tank through a vertical pipe installed in the cold water tank with an open upper end. A second pipeline connects the inlet pipeline to the hot water tank. A circulation pipeline connects the hot water outlet pipeline to the cold water outlet pipeline. A check valve is installed in the circulation pipeline allowing water to flow only from the hot water outlet pipeline to the cold water outlet pipeline.

11 Claims, 3 Drawing Sheets

(52) U.S. Cl.
CPC ...... *B67D 1/0895* (2013.01); *B67D 2001/075* (2013.01); *B67D 2210/00026* (2013.01)

(58) Field of Classification Search
CPC . B67D 2210/00013; B67D 2210/00005; A47J 31/00
USPC .................. 222/146.1, 181.1–185.1, 318, 1; 137/334, 337
See application file for complete search history.

(56) References Cited

U.S. PATENT DOCUMENTS

| | | | |
|---|---|---|---|
| 2011/0120921 A1* | 5/2011 | Kim .................... | B67D 1/0895 210/138 |
| 2013/0272921 A1* | 10/2013 | Wang .................... | A61L 2/202 422/28 |
| 2015/0298958 A1 | 10/2015 | Orita | |
| 2016/0046478 A1* | 2/2016 | Orita .................. | B67D 1/0871 222/64 |
| 2016/0362285 A1 | 12/2016 | Yui et al. | |
| 2016/0362287 A1* | 12/2016 | Yui .......................... | B67D 1/10 |
| 2021/0032086 A1* | 2/2021 | Zohar .................. | B67D 3/0067 |
| 2021/0393072 A1* | 12/2021 | Capobianco .......... | A47J 31/521 |

FOREIGN PATENT DOCUMENTS

| | | | | |
|---|---|---|---|---|
| KR | 101358073 | | 2/2014 | |
| KR | 101818711 | | 1/2018 | |
| WO | WO-2019090970 A1 * | | 5/2019 | .............. A47J 31/60 |

* cited by examiner

COLD AND HOT DRINKING WATER DISPENSER WITH DISINFECTING CIRCUIT

CROSS-REFERENCE TO RELATED APPLICATION

This application is a national stage application, filed under 35 U.S.C. § 371, of International Patent Application PCT/IB2022/055957, filed on Jun. 27, 2022, which claims the benefit of European Patent Application EP 21182069.1, filed on Jun. 28, 2021.

TECHNICAL FIELD

The disclosure is related to drinking water dispensers and in particular to drinking water dispensers connected to an external water source and equipped with a dispenser disinfection device using hot water.

BACKGROUND

Drinking water dispensers connected to an external water source are known. If the external water source is a public water-pipe, these dispensers may contain an additional tap water purification system, for example, charcoal filters. These dispensers usually also contain water cooling and heating devices.

Usually water from an external source is supplied to the cold tank, and then from the cold tank to the hot tank located below the cold tank. This scheme is convenient in that the water flows out of the dispenser due to gravity and the pressure in hot and cold water taps is the same.

Drinking water dispensers connected to an external source require regular disinfection to remove microbiological contamination inside the dispenser occurring naturally, especially if the tap water purification system removes chlorine from tap water. Disinfection can be carried out using chemicals, ozone or high temperature. Using hot water to disinfect a dispenser is known, where hot water is pumped from the hot tank to the cold tank to disinfect it.

Hot and cold water dispenser KR101358073B1 contains a cold water tank, a hot water tank located below the cold water tank, a pipeline connecting the cold water tank to the hot water tank; a pump located in the connecting pipeline and pumping water from the hot water tank to the cold water tank; a drain pipeline for draining water from the cold water tank to sewerage; and a control device draining hot water from the cold water tank at the end of the cold water tank disinfection process.

During the disinfection, hot water is supplied from the hot water tank to the cold water tank through the connecting pipeline using a pump installed in the connecting pipeline and returns back to the hot water tank through the same pipeline due to the gravity after the pump switches off. The disadvantage of this dispenser is that only the cold water tank is treated with hot water, and the inlet pipeline through which tap water is supplied to the cold water tank and the outlet pipeline through which cold water is dispensed to the consumer remain untreated. Another disadvantage is that water draining from the cold tank to sewerage is required before the start of disinfection and after the end of disinfection.

Dispenser KR101818711B1 contains a cold water tank, a hot water tank located below the cold water tank, a pipeline connecting the cold water tank to the hot water tank; a drain pipeline for draining water from the cold water tank to sewerage; an outlet pipeline, through which cold water is dispensed to the consumer through the first solenoid valve installed in the outlet pipeline, an additional pipeline connecting the hot water tank and the first solenoid valve, and the additional pipeline is equipped with a circulation pump and a second solenoid valve for connection to the first solenoid valve.

During the disinfection, hot water is supplied using the circulation pump from the hot water tank through the additional pipeline, the first and second solenoid valves and the cold water outlet pipeline to the cold water tank and returns to the hot water tank through the connecting pipeline due to the gravity. The disadvantage of this dispenser is that only the cold water tank and the cold water outlet pipeline are treated, and the inlet pipeline through which the tap water is supplied to the cold water tank remains untreated. Another disadvantage is the complication of the dispenser design due to the introduction of the additional pipeline and the additional solenoid valve to circulate hot water in the dispenser disinfection mode.

Still another disadvantage is that the hot water outlet pipeline and the hot water outlet remain untreated, and that may have unfavourable consequences because during long interruptions in the operation of the dispenser a microbiological contamination may develop in these places too.

SUMMARY

The present application provides an improved water dispenser disinfection system operation, more complete treatment of the dispenser with hot water, as well as simplification of the dispenser design and increase of its reliability.

The technical result is achieved in a drinking water dispenser comprising an inlet pipeline for connection to an external water source; an inlet solenoid valve installed in the inlet pipeline; a cold water tank equipped with a cooling device; a hot water tank equipped with a heater and installed below the cold water tank; a cold water outlet pipeline connecting the cold water tank to a cold water outlet; a hot water outlet pipeline connecting the hot water tank to a hot water outlet; a first pipeline connecting the inlet pipeline to the cold water tank; and a circulation pump for circulating hot water in a disinfection mode. The first pipeline is connected to the cold water tank through a vertical pipe with an open upper end installed in the cold water tank, a lower end of which is connected to the first pipeline, and the dispenser additionally comprises a second pipeline connecting the inlet pipeline to the hot water tank; a circulation pipeline connecting the hot water outlet pipeline to the cold water outlet pipeline; and a check valve installed in the circulation pipeline, which allows water to flow from the hot water outlet pipeline to the cold water outlet pipeline and does not allow water to flow in the opposite direction.

This design of the dispenser, in particular this method of supplying water to the cold and hot water tanks, allows to provide the simplicity of the dispenser design and the ease of switching the dispenser to the disinfection mode. To switch the dispenser from stand-by mode to disinfection mode, it is enough to switch off the cooling device and switch on the circulation pump, and additional switching of pipelines is not required.

The circulation pump is preferably installed in the second pipeline. Installation of the circulation pump in the second pipeline at the hot water tank inlet allows to improve the thermal operation of the pump (water temperature 70° C.) in the disinfection mode compared to the version with placing the pump at the hot tank outlet (water temperature 95-100° C.). While the installation of the pump in the first pipeline is undesirable, since the pump located in the first pipeline will be a possible place for the development of microbiological contamination during the operation of the dispenser.

The dispenser preferably contains a cold water outlet solenoid valve installed in the cold water outlet pipeline and a hot water outlet solenoid valve installed in the hot water outlet pipeline. The presence of outlet solenoid valves allows to control the operation of the dispenser easily using an internal controller.

It is convenient to equip the dispenser with a steam pipe connecting the upper part of the hot water tank and the upper part of the cold water tank to remove the excess steam generated when the water is heated in the hot water tank. At the same time, it is advisable to install an additional solenoid valve in the steam pipe to close the steam pipe in the disinfection mode of the dispenser. Closing the steam pipe allows to increase the pressure in the hot water tank and thereby increase the hot water flow through the check valve, without allowing hot water to flow through the steam pipe into the cold water tank.

A method for disinfection of the dispenser is also proposed. When disinfecting the dispenser, first, the cold water tank cooling device is switched off, second, the circulation pump is switched on providing the circulation of hot water from the hot water tank through the hot water outlet pipeline, through the check valve, through the cold water outlet pipeline to the cold water tank and from the cold water tank through the vertical pipe installed in the cold water tank, through the first inlet pipeline, the second inlet pipeline and the circulation pump back to the hot water tank. As a result, all circulating water is heated to the set temperature for disinfection. Circulation of hot water through the pipelines and the cold water tank purifies both the cold water tank and the pipelines from microbiological contamination.

DETAILED DESCRIPTION

Figure 1:
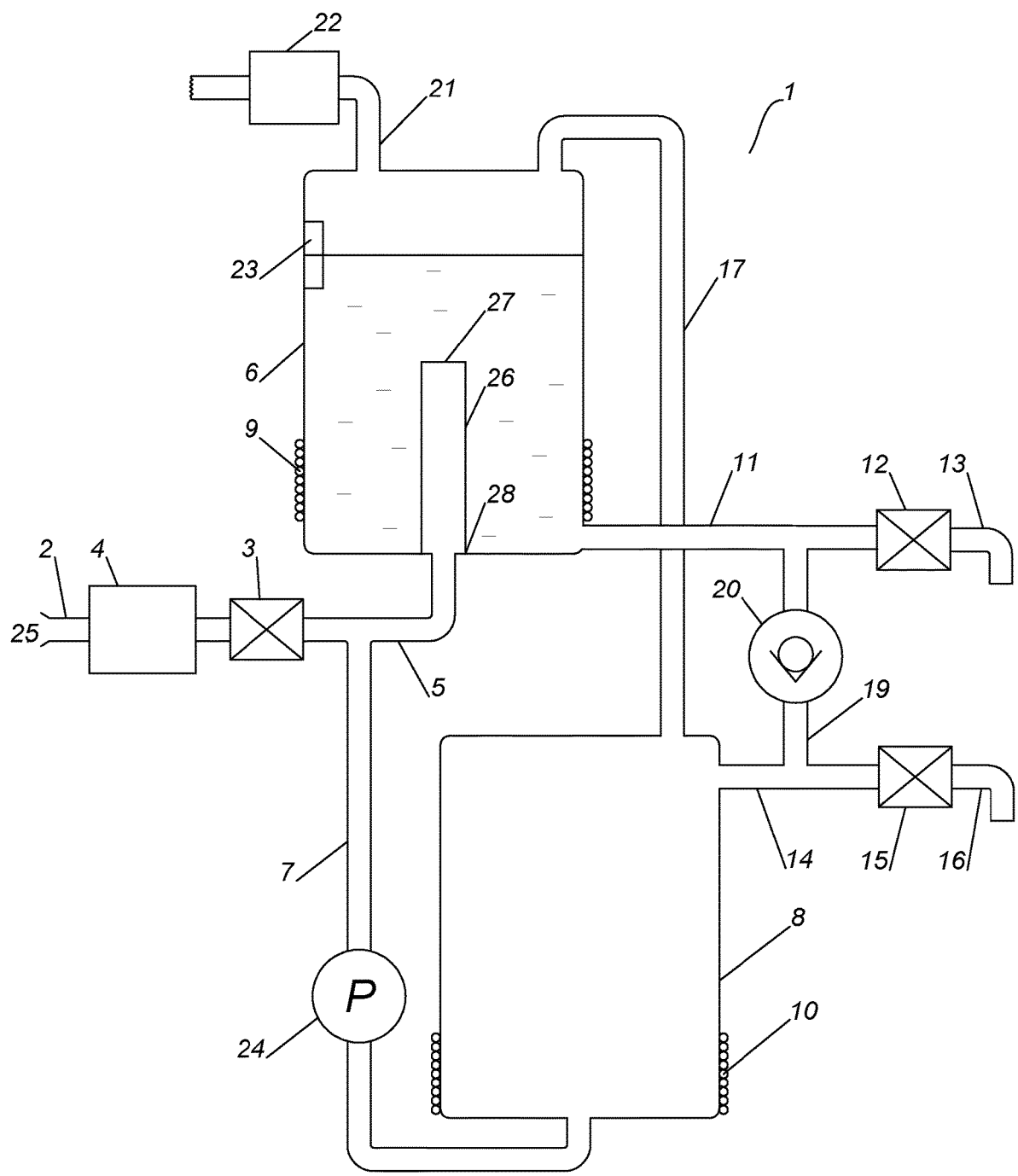
FIG. 1 shows an embodiment of the dispenser.

FIG. 1 shows a schematic image of the drinking water dispenser. The dispenser 1 is connected to an external water source 25, for example, public water-pipe, through a main inlet pipeline 2. An external source can be any source from which water is supplied under pressure: water-pipe, a reservoir with a pump, a pump pumping water from a well, a tap water purification system, etc. An inlet solenoid valve 3 is installed in the inlet pipeline 2. If necessary, a filter 4 can be installed in the inlet pipeline 2 for additional purification of water supplied to the dispenser 1. The filter 4 is installed before the inlet solenoid valve 3. After the inlet solenoid valve 3, the inlet pipeline 2, through a first pipeline 5, is connected to a cold water tank 6, and through a second pipeline 7, in which a circulation pump 24 is installed, to a hot water tank 8. The cold water tank 6 is connected to the first pipeline 5 through a vertical pipe 26 located in the cold water tank 6, a lower end 28 of which is connected to the first pipeline 5, and an open upper end 27 is located at a certain height from the bottom of the tank 6, below the water level in the tank 6.

Water supply to the cold water tank 6 from the bottom allows to simplify the design of the dispenser and to ensure the hot water disinfection of the pipeline through which water is supplied to the tank 6. First, water supply through the vertical pipe 26 ensures the supply of uncooled water from the water-pipe to the upper part of the tank 6. Second, in the hot water dispensing mode with weak water pressure in the inlet pipeline 2, water coming from the cold water tank 5 to the hot water tank 8 will be taken from the upper part of the tank 6, where the water is less cold. Third, in the disinfection mode, the hot water inflow through the outlet pipeline 11 and outflow through the open upper end 27 of the vertical tube 26 ensures hot water mixing in the tank 6, which improves its disinfection.

The cold water tank 6 is equipped with a cooling device 9, and the hot water tank 8 is equipped with a heater 10. The cold water tank 6 is connected to the cold water outlet 13 through the cold water outlet pipeline 11 and the cold water outlet solenoid valve 12. Respectively, the hot water tank 8 is connected to the hot water outlet 16 through the hot water outlet pipeline 14 and the hot water outlet solenoid valve 15. The hot water tank 8 is also connected to the cold water tank 6 through the steam pipe 17. The hot water outlet pipeline 14 is connected to the cold water outlet pipeline 11 through a circulation pipeline 19. A check valve 20 is installed in the circulation pipeline 19 allowing water, at a certain pressure, to flow from the hot water outlet pipeline 14 into the cold water outlet pipeline 11 and not allowing water to flow in the opposite direction, i.e., from the cold water pipeline 11 to the hot water pipeline 14. To ensure the hot water circulation in the disinfection mode of the dispenser, a circulation pump 24 is installed in the second pipeline 7 before the hot water tank 8.

The cold water tank 6 is connected to the surrounding air space through an air duct 21. An air filter 22 is installed in the air duct 21. The filter 22 can be additionally equipped with a device sterilizing the outside air entering the dispenser. The cold water tank 6 is also equipped with a water level sensor 23.

The hot water tank 8 is installed below the cold water tank 6. The hot water tank 8 is connected to the cold water tank 6 through the steam pipe 17. During the operation of the dispenser, the hot water tank 8 is completely filled with water, in the cold water tank 6 the lower part of the tank 6 is filled with water, and in the upper part of the tank 6 there is air. Therefore, the excess steam generated when the water in the hot water tank 8 is heated is discharged through the steam pipe 17 into the air space of the cold water tank 6. And the resulting excess air pressure in the cold water tank 6 is discharged into the outside air through the air duct 21.

The inlet solenoid valve 3, the cold water outlet solenoid valve 12 and the hot water outlet solenoid valve 15 are normally closed.

The dispenser works as follows. After connecting the dispenser 1 through the inlet pipeline 2 to the water source 25 and switching on the dispenser 1, the inlet solenoid valve 3 opens, while the cold water outlet solenoid valve 12 and the hot water outlet solenoid valve 15 are closed. Water from the external source 25 enters the dispenser 1 and, after the inlet solenoid valve 3, through the second pipeline 7 enters the hot water tank 8, and through the first pipeline 5 and the vertical pipe 26 enters into the cold water tank 6. Air displaced with water pressure from the hot water tank 8 through the steam pipe 17 enters the air space of the cold water tank 6, and from there through the air duct 21 to the outside. Water from the external source 25 simultaneously enters both tanks 6 and 8, but since the hot water tank 8 is located below the cold water tank 6, it is filled first. When the water level in the cold water tank 6 reaches the set level determined by the water level sensor 23, the inlet solenoid valve 3 closes. Then the water in the cold water tank 6, using the cooling device 9, is cooled to the set temperature, and the water in the hot water tank 8, using the heater 10, is heated to the set temperature. Upon reaching the set cold and hot water temperatures, the dispenser is ready for operation and goes into stand-by mode.

When cold water is dispensed, the cold water outlet solenoid valve 12 opens and water flows from the cold water tank 6 through the cold water outlet pipeline 11 to the cold water outlet 13. When the water level in the cold water tank 6 falls below the set value determined by the water level sensor 23, the inlet solenoid valve 3 opens and the water from the external source 25 enters the cold water tank 6 through the first pipeline 5 and through the vertical pipe 26, filling it to the set water level value.

When hot water is dispensed, the hot water outlet solenoid valve 15 opens and the inlet solenoid valve 3 opens simultaneously, the water from the external source 25 enters the hot water tank 8 through the second pipeline 7 and under the pressure of the incoming water, water from the hot water tank 8 enters the hot water outlet 16 through the hot water outlet pipeline 14. If water pressure from the external source 25 is insufficient to ensure the flow of hot water flowing out of the dispenser 1, water from the cold water tank 6 will also enter the hot water tank 8 through the vertical pipe 26, the first pipeline 5 and the second pipeline 7, thus ensuring the required flow of outflowing hot water.

If the water pressure from the external source 25 falls, the cold water tank 6 located above the hot water tank 8 plays the role of a water tower, maintaining the required pressure in the hot water tank 8. This allows to ensure the required flow of water at the hot water outlet 16.

To ensure that the water does not enter the cold water tank 6 in the hot water dispensing mode with normal pressure of water coming from the external source 25, the diameter of the first pipeline 5 is slightly smaller than the diameter of the second pipeline 7. It is also possible to install an additional normally open solenoid valve 29 in the first pipeline 5 as shown in the dispenser version in FIG. 2, which will close in the hot water dispensing mode with normal pressure from the external source 25 and only open in this mode when the pressure from an external source 25 falls.

Disinfection mode. In this mode, the normally closed solenoid valves: the inlet solenoid valve 3, the cold water outlet solenoid valve 12 and the hot water outlet solenoid valve 14 remain closed. The cooling device 9 switches off. The circulation pump 24 located in the hot water inlet pipeline 7 switches on, pumping water from the cold water tank 6 to the hot water tank 8, from where the water, under pressure from the pump 24, enters the hot water outlet pipeline 14, then through the circulation pipeline 19 with the check valve 20 to the cold water outlet pipeline 11, then to the cold water tank 6, and through the vertical pipe 26, the first pipeline 5 and the second pipeline 7, water returns to the pump 24. Water circulating in the dispenser 1, flowing through the hot tank water 8, is heated by the heater 10. After water is heated to the set temperature, hot water circulation continues for the set time. The circulation time and water temperature are determined depending on the operating conditions of the dispenser 1. For example, the circulation of water heated to 67-80° C. for one or two hours can be carried out weekly to maintain microbiological purity in the continuously operating dispenser 1. The disinfection mode may additionally switch on after long breaks in the dispenser operation.

To control the disinfection process, the dispenser can be equipped with one or more temperature sensors.

Figure 2:
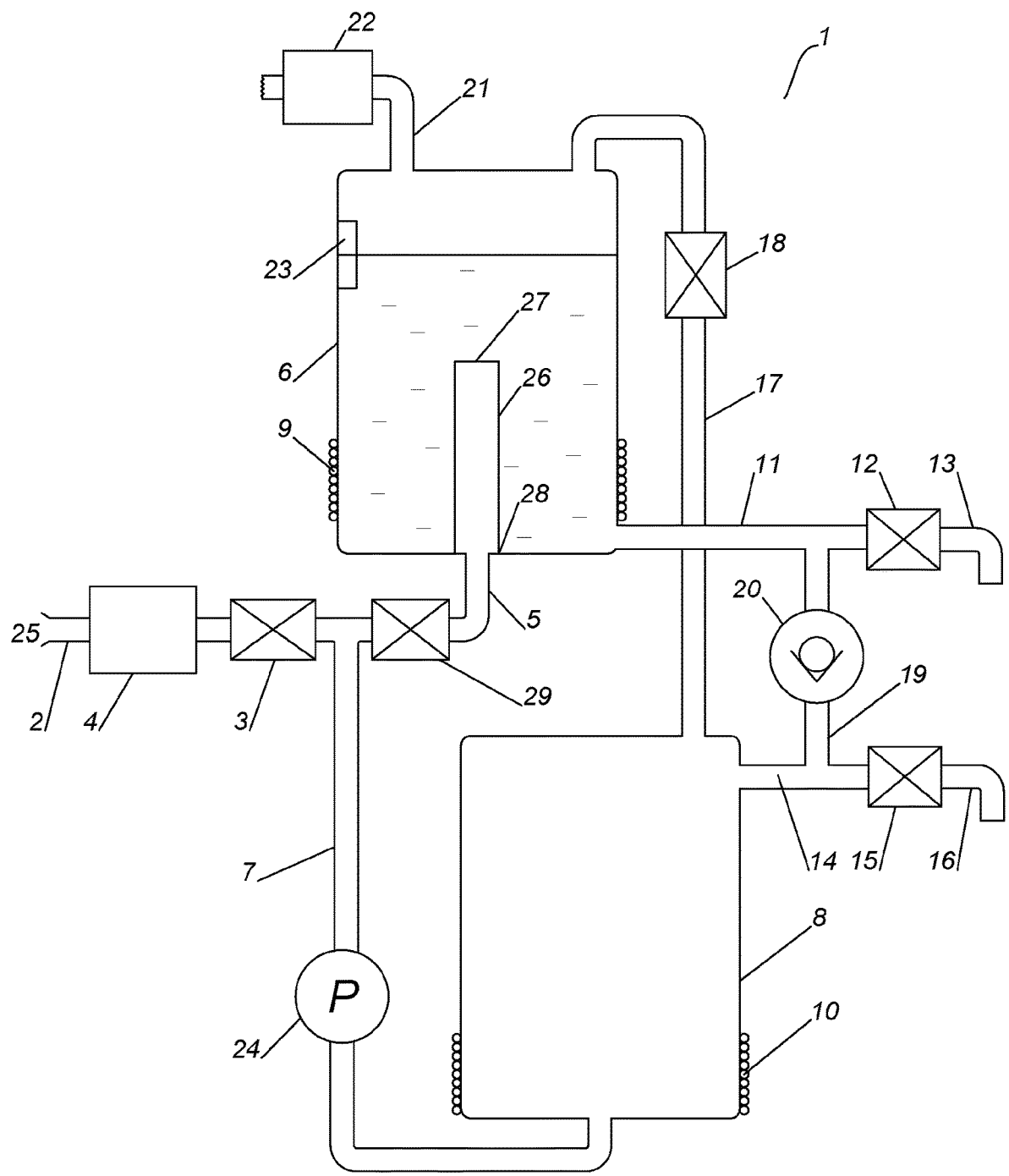
FIG. 2 shows another embodiment of the dispenser.

FIG. 2 shows another embodiment of the dispenser. This embodiment differs from the version shown in FIG. 1, first, by the presence of the additional normally open solenoid valve 18 in the steam pipe 17. The additional normally open solenoid valve 18 in the steam pipe 17 closes in the disinfection mode of the dispenser. Closing the steam pipe 17 in the disinfection mode of the dispenser allows to increase the pressure in the hot water tank 8 and thus increase the hot water flow through the check valve 20, while preventing hot water from flowing through the steam pipe 17. The increased water pressure in the disinfection mode also allows to reduce the requirements to the accuracy of actuation of the check valve 20.

Another difference of the dispenser shown in FIG. 2 is the presence of the additional solenoid valve 29 in the first pipeline 5. The solenoid valve 29 is normally open and may be closed in the hot water dispensing mode of the dispenser, which can be useful in case of excessively high water pressure in the inlet pipeline. The presence of this valve allows to prevent the water from entering the cold water tank during the hot water dispensing from the dispenser even in the absence of means for adjusting the inlet pressure.

In the embodiments of the dispenser shown in FIG. 1 and FIG. 2, the check valve 20 is installed in the circulation pipeline 19 connecting the hot water and cold water outlet pipelines 11 and 14. It should be clear to a person skilled in the art that when the outlet pipelines 11 and 14 are located close to each other, the circulation pipeline 19 can be very short or the flanges of the check valve can act as such.

Figure 3:
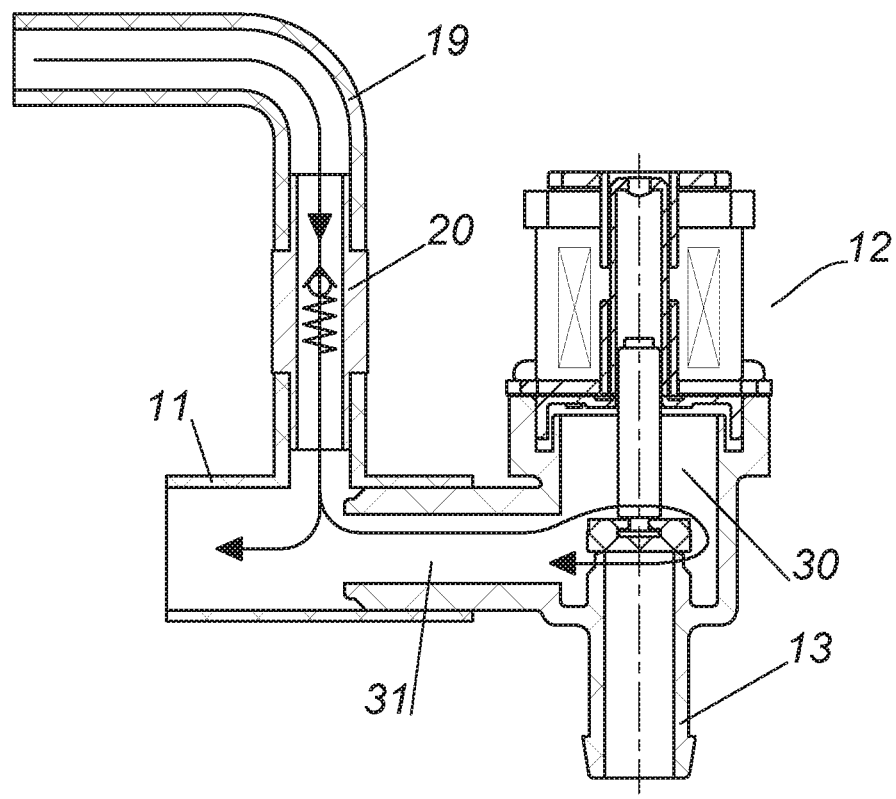
FIG. 3 shows a connection of the circulation pipeline to a cold water outlet pipeline.

FIG. 3 shows a version of the implementation of the connecting of the circulation pipeline 19 to one of the outlet pipelines, in this case to the cold water outlet pipeline 11. It is desirable that the circulation pipeline 19 is connected to the outlet pipeline 11 as close to the outlet valve 12 as possible. Then, hot water from the hot water tank 8, flowing through the outlet pipeline 11 in disinfection mode, will heat the water in the inlet duct 31 of the solenoid valve 12 and through it also the water in the inner chamber 30 of the outlet solenoid valve 12, thus also disinfecting the inner space of the solenoid valve 12. And if the water outlet 13 and the solenoid valve body are made of a material with high thermal conductivity, for example, metal, then the water outlet 13 will also be disinfected.

Therefore, complete disinfection of the water path of the dispenser is carried out in the proposed dispenser. Disinfection of the entire water path from the inlet solenoid valve 3 up to the outlet solenoid valves 12 and 15 is carried out without significantly complicating the design of the dispenser. With this configuration of the dispenser 1, only two elements are introduced for disinfection—the check valve 20 and the circulation pump 24 and, if necessary, the additional solenoid valve 18 in the steam pipe 17.

REFERENCE SIGNS LIST 1 dispenser
2 inlet pipeline
3 inlet solenoid valve
4 filter
5 first pipeline
6 cold water tank
7 second pipeline
8 hot water tank
9 cooling device
10 heater
11 cold water outlet pipeline
12 cold water outlet solenoid valve 13 cold water outlet
14 hot water outlet pipeline
15 hot water outlet solenoid valve
16 hot water outlet
17 steam pipe
18 solenoid valve in steam pipe
19 circulation pipeline
20 check valve
21 air duct
22 air filter
23 water level sensor
24 circulation pump
25 external water source
26 vertical pipe
27 open upper end
28 lower end
29 solenoid valve in the first pipeline
30 inner chamber of the outlet solenoid valve
31 input duct of the outlet solenoid valve

The invention claimed is:

1. A drinking water dispenser (1) comprising:
an inlet pipeline (2) for connection to an external water source (25);
an inlet solenoid valve (3) installed in the inlet pipeline (2);
a cold water tank (6) equipped with a cooling device (9);
a hot water tank (8) equipped with a heater (10) and installed below the cold water tank (6);
a cold water outlet pipeline (11) connecting the cold water tank (6) to a cold water outlet (13);
a hot water outlet pipeline (14) connecting the hot water tank (8) to a hot water outlet (16);
a first pipeline (5) connecting the inlet pipeline (2) to the cold water tank (6);
a circulation pump (24) ensuring circulation of hot water in a disinfection mode;
a second pipeline (7) connecting the inlet pipeline (2) to the hot water tank (8);
a circulation pipeline (19) connecting the hot water outlet pipeline (14) to the cold water outlet pipeline (11); and
a check valve (20) installed in the circulation pipeline (19) allowing water to flow from the hot water outlet pipeline (14) to the cold water outlet pipeline (11) and not allowing water to flow in the opposite direction,
wherein the first pipeline (5) is connected to the cold water tank (6) through a vertical pipe (26) with an open upper end (27) installed in the cold water tank (6), a lower end (28) of which is connected to the first pipeline (5).

2. The drinking water dispenser according to claim 1, wherein the circulation pump (24) is installed in the second pipeline (7).

3. The drinking water dispenser according to claim 1, further comprising
a steam pipe (17) connecting an upper part of the hot water tank (8) to an upper part of the cold water tank (6).

4. The drinking water dispenser according to claim 3, further comprising
a solenoid valve (18) installed in the steam pipe (17).

5. The drinking water dispenser according to claim 1, wherein the drinking water dispenser is adapted for connection to a water-pipe.

6. The drinking water dispenser according to claim 5, further comprising a water filter (4) installed in the inlet pipeline (2) upstream of the inlet solenoid valve (3).

7. The drinking water dispenser according to claim 1, further comprising
an additional solenoid valve (29) installed in the first pipeline (5).

8. The drinking water dispenser according to claim 1, further comprising
a cold water outlet solenoid valve (12) installed in the cold water outlet pipeline (11) and
a hot water outlet solenoid valve (15) installed in the hot water outlet pipeline (14).

9. The drinking water dispenser according to claim 8, wherein the circulation pipeline (19) with the check valve (2) is installed upstream of the cold water outlet solenoid valve (12) and upstream of the hot water outlet solenoid valve (15).

10. A method, comprising:
providing the drinking water dispenser according to claim 1;
switching off the cooling device (9);
switching on the circulation pump (24);
switching off the circulation pump (24); and
switching on the cooling device (9).

11. The method according to claim 10, further comprising:
controlling a hot water temperature; and
switching off the heater (10) when the hot water temperature reaches a set value.

* * * * *